United States Patent
Lockwood et al.

(10) Patent No.: US 8,924,124 B2
(45) Date of Patent: Dec. 30, 2014

(54) METHOD AND SYSTEM FOR ENGINE TORQUE CONTROL

(75) Inventors: John Anthony Lockwood, Canton, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 543 days.

(21) Appl. No.: 13/352,095

(22) Filed: Jan. 17, 2012

(65) Prior Publication Data

US 2013/0184966 A1 Jul. 18, 2013

(51) Int. Cl.
B60W 10/06 (2006.01)

(52) U.S. Cl.
USPC .................. 701/102; 701/34.3; 701/84

(58) Field of Classification Search
CPC ........... F02D 2200/1002; F02D 2200/1004; B60W 2050/046; B60W 2050/065; B60W 2710/0666
USPC ............ 701/34.3, 84, 101, 102, 106; 123/674
See application file for complete search history.

(56) References Cited

U.S. PATENT DOCUMENTS

| | | | |
|---|---|---|---|
| 6,353,785 B1 * | 3/2002 | Shuman et al. ............. | 701/48 |
| 6,427,109 B1 * | 7/2002 | Doering et al. ............. | 701/54 |
| 6,941,202 B2 * | 9/2005 | Wilson et al. ............. | 701/31.5 |
| 6,993,421 B2 * | 1/2006 | Pillar et al. ............. | 701/29.4 |
| 7,020,547 B2 | 3/2006 | Ogaki | |
| 7,184,866 B2 * | 2/2007 | Squires et al. ............. | 701/29.3 |
| 7,236,869 B2 * | 6/2007 | Buckley et al. ............. | 701/51 |
| 7,286,927 B2 | 10/2007 | DeCarlo et al. | |
| 7,487,266 B2 * | 2/2009 | Wakabayashi ............. | 710/21 |
| 7,512,477 B2 * | 3/2009 | Quigley et al. ............. | 701/103 |
| 7,844,404 B2 * | 11/2010 | Ling et al. ............. | 702/41 |
| 8,285,439 B2 * | 10/2012 | Hodges ............. | 701/31.5 |
| 8,386,091 B2 * | 2/2013 | Kristinsson et al. ............. | 701/2 |
| 8,560,165 B2 * | 10/2013 | Salman et al. ............. | 701/31.5 |
| 8,571,782 B2 * | 10/2013 | Barkowski et al. ............. | 701/100 |
| 2004/0093264 A1 * | 5/2004 | Shimizu ............. | 705/13 |
| 2006/0206613 A1 * | 9/2006 | Narita ............. | 709/227 |
| 2007/0027593 A1 * | 2/2007 | Shah et al. ............. | 701/30 |
| 2007/0088883 A1 * | 4/2007 | Wakabayashi ............. | 710/110 |
| 2008/0059035 A1 * | 3/2008 | Siddiqui et al. ............. | 701/93 |
| 2010/0063668 A1 * | 3/2010 | Zhang et al. ............. | 701/30 |
| 2010/0070237 A1 | 3/2010 | Yitbarek et al. | |
| 2010/0228423 A1 * | 9/2010 | Howell et al. ............. | 701/29 |
| 2011/0130905 A1 * | 6/2011 | Mayer ............. | 701/22 |
| 2011/0166739 A1 * | 7/2011 | Oesterling ............. | 701/30 |

* cited by examiner

Primary Examiner — Erick Solis
(74) Attorney, Agent, or Firm — Julia Voutyras; Alleman Hall McCoy Russell & Tuttle LLP

(57) ABSTRACT

Methods and systems are provided for improving vehicle torque control accuracy. Data points of an engine torque data set are adjusted en masse by an on-board vehicle controller while also being adjusted individually by an off-board controller. By adjusting engine operation based on a torque data set that is updated by each of the on-board and off-board controllers, engine torque errors can be reliably determined and compensated for.

21 Claims, 4 Drawing Sheets

METHOD AND SYSTEM FOR ENGINE TORQUE CONTROL

FIELD

The present application relates to systems and methods for providing more accurate torque control.

BACKGROUND/SUMMARY

Engine control systems may use various torque estimation methods (e.g., output from one or more torque sensors) in combination with various torque control methods (e.g., adaptive open-loop or closed-loop control methods) to provide reliable torque estimation and actuation. In particular, such control systems aim to improve torque accuracy by combining a reliable engine torque output measurement with an adaptive loop correction.

However the inventors herein have identified potential issues with such an approach. As one example, the engine torque measurements may not give enough information in the raw form to precisely correct the control system's characterization of the multiple degrees of freedom that affect engine torque. For example, an error between the torque produced by the engine and the torque commanded by the engine control system can be due to multiple factors such as injectors metering an incorrect amount of fuel, drift in mass airflow sensor measurements, thermal and mechanical losses in the system incurred due to age and/or other environmental factors, etc. Therefore, without knowing what is causing the difference between the commanded torque and the estimated torque, an appropriate correction may not be applied, and torque errors may remain. As such, data analysis methods may be applied to refine the raw engine torque information for more accurate torque correction. However, such analysis methods may be computation intensive. The processing power and memory required for such analysis methods may not be met by control systems currently configured on vehicles.

Some of the above issues may be at least partly addressed by a method of controlling a vehicle torque comprising, adjusting each data point of an engine torque data set with a slope and offset modifier from engine torque data on-board the vehicle, adjusting individual data points of the engine torque data set from engine torque data off-board the vehicle, and adjusting an engine operation based on the engine torque data set. In this way, engine torque data may be adjusted on-board the vehicle while the data is concurrently analyzed off-board for further torque accuracy.

In one example, an on-board vehicle control system may compute an on-board torque estimate based on torque inputs from various sensors on-board the vehicle and further based on adaptive torque adjustments. Therein, the vehicle control system may adjust an engine torque data set using a computation model that determines torque adjustment slopes and/or offset modifiers that are applied to all data points in the torque data set, en masse. That is, each and every data point of the data set may be adjusted in the same manner, with the same modifier. In parallel, the inputs from the various sensors and the on-board torque adjustments may be uploaded to an off-board control system, such as a cloud computing system communicatively coupled to the on-board control system, wherein the torque data may be analyzed in a more computation intensive manner using a computation model having a larger number of constraints and parameters. The off-board control system may adjust one or more individual data points independently. That is, only some of the data points of the data set may be adjusted, and the adjustments of the affected data points may be different from, and independent of each other. The off-board torque adjustments may be downloaded and combined with the on-board torque adjustments to provide more accurate torque control.

In this way, by performing some torque data processing on-board the vehicle using some parameters while performing additional torque data processing off-board the vehicle using additional parameters, a more reliable torque estimate may be achieved while maintaining the processing power and memory configuration of the on-board vehicle control system. By improving torque control, engine and vehicle performance may be improved.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
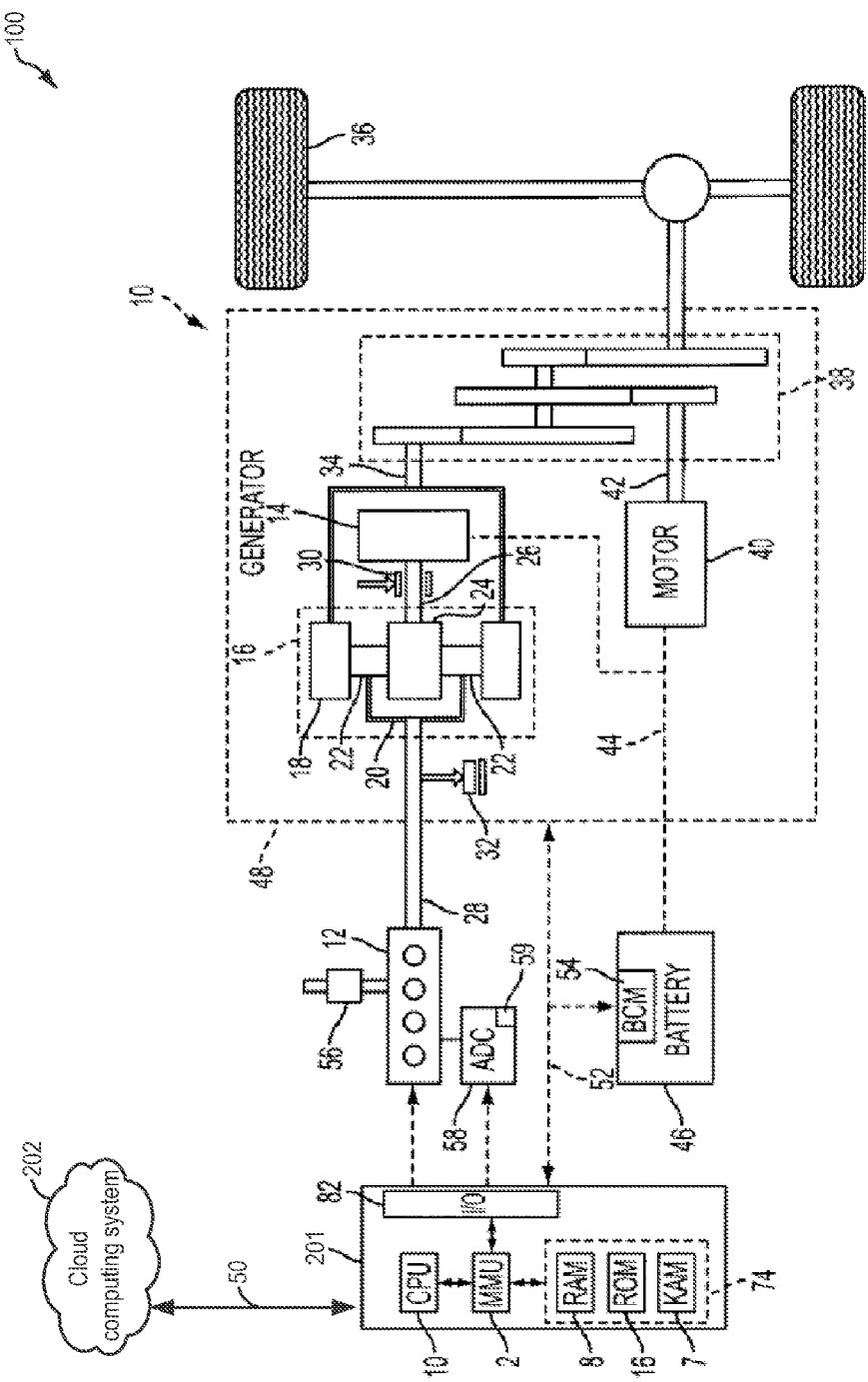
FIG. 1 shows an example powertrain in a hybrid electric vehicle (HEV) system.
Figure 2:
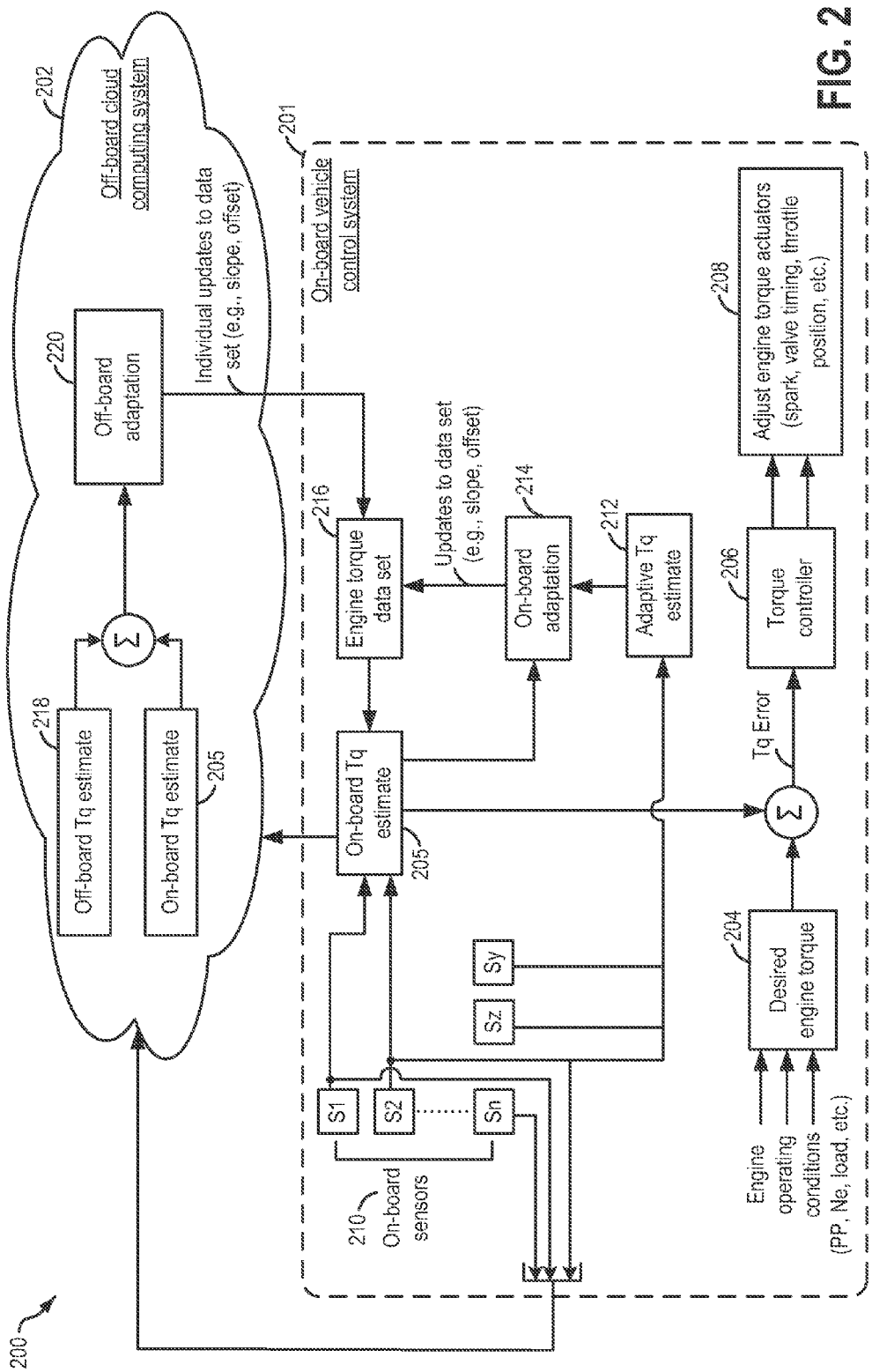
FIG. 2 shows a controller block diagram illustrating a system for controlling the vehicle powertrain of FIG. 1 to control a vehicle torque.

Methods and systems are provided for improving the accuracy of torque control in a vehicle system, such as vehicle system of FIG. 1. In particular, as shown in FIG. 2, engine torque data may be processed on-board a vehicle by a vehicle controller while concurrently, the same engine data is processed off-board the vehicle by a cloud computing system. The off-board processing may include a larger number of constraints and/or parameters, and consequently may be more computation intensive than the on-board processing. The vehicle controller may be configured to perform a routine, such as the example method of FIG. 3, to process the engine data on-board the vehicle and determine slopes and/or offset modifiers with which all the data points of an engine torque data set are adjusted. At the same time, the controller may upload the data to an off-board controller that determines independent adjustments for one or more data points in the engine torque data set. The independent adjustments may be downloaded by the vehicle controller and used to further update the engine torque data set. Engine operations may then be adjusted based on the updated data set. Example off-board and on-board adjustments are illustrated herein with reference to FIG. 4. In this way, by performing some processing on-board and additional processing off-board, the accuracy of torque control may be improved.

FIG. 1 includes a schematic block diagram representation of a vehicle system 100 to illustrate one embodiment of a system or method for controlling a vehicle powertrain according to the present invention. Vehicle system 100 generally represents any vehicle having a conventional or hybrid electric powertrain with an internal combustion engine (ICE) 12. In the depicted embodiment, the vehicle system 100 is a hybrid electric vehicle (HEV) system wherein the powertrain 11 includes an internal combustion engine, a battery 46, and an electrical machine (e.g., a motor and/or a generator). However, it will be appreciated that in alternate embodiments, the torque control methods discussed herein may be applied to other hybrid vehicle configurations as well as conventional vehicles having an internal combustion engine.

The vehicle powertrain 11 includes engine 12 and an electric machine coupled to the engine via a gearset (herein depicted as generator 14). As such, generator 14 may also be referred to as an electric machine as it may operate as either a motor or a generator. Engine 12 and generator 14 are connected through a power transfer unit or transmission, which in this embodiment is implemented by a planetary gearset 16. As such, other types of power transfer units, including other gearsets and transmissions, may be used to connect engine 12 to generator 14. Planetary gearset 16 includes a ring gear 18, a carrier 20, planet gears 22, and a sun gear 24.

Generator 14 can be used to provide electric current to charge battery 46 or operate motor 40. Alternatively, generator 14 may be operated as a motor to provide an output torque to shaft 26 connected to sun gear 24. Similarly, operation of engine 12 supplies a torque to shaft 28, which is connected to carrier 20. A brake 30 is provided for selectively stopping rotation of shaft 26, thereby locking sun gear 24 in place. Since this configuration allows torque to be transferred from generator 14 to engine 12, a one-way clutch 32 is provided so that shaft 28 rotates in only one direction. In addition, generator 14 can be used to control the rotational speed of engine 12 via planetary gearset 16 and shaft 28 when and if desired.

Ring gear 18 is connected to a shaft 34, which is connected to vehicle drive wheels 36 through a second gearset 38. Vehicle system 100 further includes a motor 40, which can be used to output torque to shaft 42. Motor 40 may also be referred to as an electric machine as it may operate as either a motor or a generator. In particular, battery 46 may be configured to power the electric machine and operate it as a motor. Other vehicles within the scope of the present invention may have different electric machine arrangements, such as more or less than the two electric machines (generator 14 and motor 40) depicted herein. In the embodiment shown in FIG. 1, both electric machines 14, 40 may be operated as motors using electric current from battery 46 or another source of electric current to provide a desired output torque. Alternatively, both electric machines 14, 40 may be operated as generators supplying electrical power to a high voltage bus 44 and/or to an energy storage device, represented by high voltage battery 46. Other types of energy storage devices and/or output devices that can be used include, for example, a capacitor bank, a fuel cell, a flywheel, etc. As shown in FIG. 1, motor 40, generator 14, planetary gear set 16, and a portion of second gear set 38 may generally be referred to as a transaxle 48.

One or more control systems 201, 202 implemented in hardware and/or software are provided to control engine 12 and the components of transaxle 48. In the embodiment of FIG. 1, control system 201 is an on-board vehicle control system located on-board the vehicle while control system 202 is an off-board control system not located on the vehicle. Although control system 201 is shown as a single controller, it may include multiple hardware and/or software controllers.

For example, control system 201 may include a separate powertrain control module (PCM), which could be software embedded within control system 201, or the PCM could be implemented by a separate hardware device with corresponding software. Those of ordinary skill in the art will recognize that a controller may be implemented by a dedicated hardware device that may include programmed logic and/or an embedded microprocessor executing computer readable instructions to control the vehicle and powertrain. A controller area network (CAN) 52 may be used to communicate control data and/or commands between control system 201, transaxle 48, and one or more other control modules, such as battery control module (BCM) 54. For example, BCM 54 may communicate data such as battery temperature, state-of-charge (SOC), discharge power limit, and/or other operating conditions or parameters of battery 46. Devices other than battery 46 may also have dedicated control modules that communicate with control system 201 to implement control of the vehicle and powertrain. For example, an engine control unit (ECU) may communicate with control system 201 to control operation of engine 12, and a transaxle control module (TCM) may be configured to control specific components within transaxle 48, such as generator 14 and/or motor 40.

In the depicted embodiment, off-board control system 202 is a cloud computing system that is communicatively coupled to the on-board vehicle control system. For example, the control systems may be coupled via wireless communication 50 which can be Wi-Fi, Bluetooth, any type of cellular service or any generic wireless data transfer protocol. As such, this connectivity where the vehicle data is uploaded, also referred to as the "cloud", may be a service such as "Airbiquity Service", an alternate commercial service or a private server where the data is stored and then acted upon by optimization algorithms. The algorithms may process the data from a single vehicle, a family of engines, a family of powertrains, or a combination thereof. The algorithms may further take into account the system limitations, produce torque adjustment slopes and/or offset modifiers that are properly constrained, and send them back to the vehicle where they are applied.

Any or all of the various controllers or control modules, such as control systems 201, 202 and BCM 54 may include a microprocessor based central processing unit (CPU) 10 in communication with a memory management unit (MMU) 2 that manages various computer-readable storage media 74. The computer readable storage media preferably include various types of volatile and non-volatile memory such as a read-only memory (ROM) 16, a random-access memory (RAM) 8, and a keep-alive memory (KAM) 7. The computer-readable storage media may be implemented using any of a number of known temporary and/or persistent memory devices such as PROMs, EPROMs, EEPROMs, flash memory, or any other electric, magnetic, optical or combination memory capable of storing data, code, instructions, calibration information, operating variables, and the like used by CPU 10 in controlling the engine, vehicle, or various subsystems. For controller architectures that do not include MMU 2, CPU 10 may communicate directly with one or more storage media 74. CPU 10 communicates with the various sensors and actuators of the engine, vehicle, etc. via an input/output (I/O) interface 82.

Vehicle system 100 may also include one or more emission control devices 56. These may include, for example, a carbon canister for collecting fuel vapors to reduce emissions. From time to time, the carbon canister may be purged, such that collected vapors are taken into the engine air intake system and combusted. Emission control device 56 may also include one or more catalysts or catalytic reactors in various configurations to treat exhaust gases of engine 12. In addition to emissions control or device 56, vehicle system 100 may also include one or more engine or motor driven accessories (AC/DC) 58. Since the accessories 58 use torque produced by engine 12 and/or electrical energy from battery 46 and/or electrical machines 14, 40, one or more of the accessories 58 may be selectively controlled by vehicle control system 201 to more accurately control torque production of engine 12 when operating near the combustion stability limit. For example, an air conditioning system may include a compressor 59 whose operation is adjusted by the control system during selected operating modes to more accurately control operation of engine 12.

Now turning to FIG. 2, map 200 shows a block diagram illustrating an embodiment of a method for controlling vehicle torque. The method may be implemented in a vehicle system, such as that of FIG. 1. The method enables data points of an engine torque data set to be processed both on-board the vehicle and off-board the vehicle, the on-board processing being different from the off-board processing.

An on-board vehicle control system 201 may estimate a desired engine torque 204 based on various engine operating conditions and parameters, such as engine speed, accelerator pedal position, engine load, etc. For the representative embodiment of an HEV illustrated in FIG. 1, the desired engine torque may represent the amount of torque to be delivered by engine 12 taking into consideration additional factors (that is, in addition to those listed above) such as vehicle operating mode, battery state of charge (SOC), engine coolant temperature, motor current, cruise control status, emission control device status, engine idle mode, etc. Desired engine torque 204 may have been filtered or delayed to account for physical properties of the engine intake manifold, and may incorporate various estimated or measured operating parameters such as barometric pressure, mass air flow, ambient temperature, and the like to approximate the dynamics of the intake manifold.

Desired engine torque 204 is compared to a current engine torque (on-board torque estimate 205) estimated by the on-board vehicle control system 201 to determine a torque error that is fed to torque controller 206. Based on the determined torque error, torque controller 206 may adjust various engine torque actuators at 208. The adjustments performed may include airflow control, such as implemented by adjustments to a throttle position and/or valve timing. Valve timing adjustments may be performed for intake and/or exhaust valves and may include adjusting a valve opening time, a valve closing time, a duration of valve opening, valve overlap, etc. In still further embodiments, such as in engines including a supercharger or turbocharger, airflow control of torque may be achieved by controlling boost. The adjustments performed by torque controller 206 may also include spark control of torque wherein a spark ignition timing is adjusted (e.g., advanced or retarded from MBT). Still other engine actuators may be adjusted to achieve torque control.

The on-board torque estimate 205 may be determined by on-board control system 201 based on input from one or more on-board sensors 210 (depicted herein as S1-Sn). The one or more sensors 210 may be configured to provide an estimate of an engine torque and may include, for example, torque sensors, torque indicators, engine speed sensors, shaft speed sensors, air flow sensors, temperature sensors, etc.

While FIG. 2 shows various on-board sensors and torque indicators, it will be appreciated that the various torque sensors and torque indicators may also include various torque measurement or inference mechanisms including, for example, one or more of crankshaft torque sensors, a zero torque measurement in a transmission of the vehicle system based on an open clutch state, cylinder pressure sensors, a pumping torque estimate, transmission input or output shaft torque sensors, a transmission gear ratio estimate, torque multiplication and/or losses incurred to translate measured torque into engine crankshaft torque, an engine torque estimate based on torque balance with torque measured or inferred from an electric motor, an engine torque estimate based on torque converter turbine torque calculated from measured turbine and impeller speeds, a characterization of the torque converter, and other torque sources or losses between the impeller and engine output; an engine torque estimate based on estimated transmission clutch torque, and an engine torque estimate based on vehicle acceleration.

Figure 4:
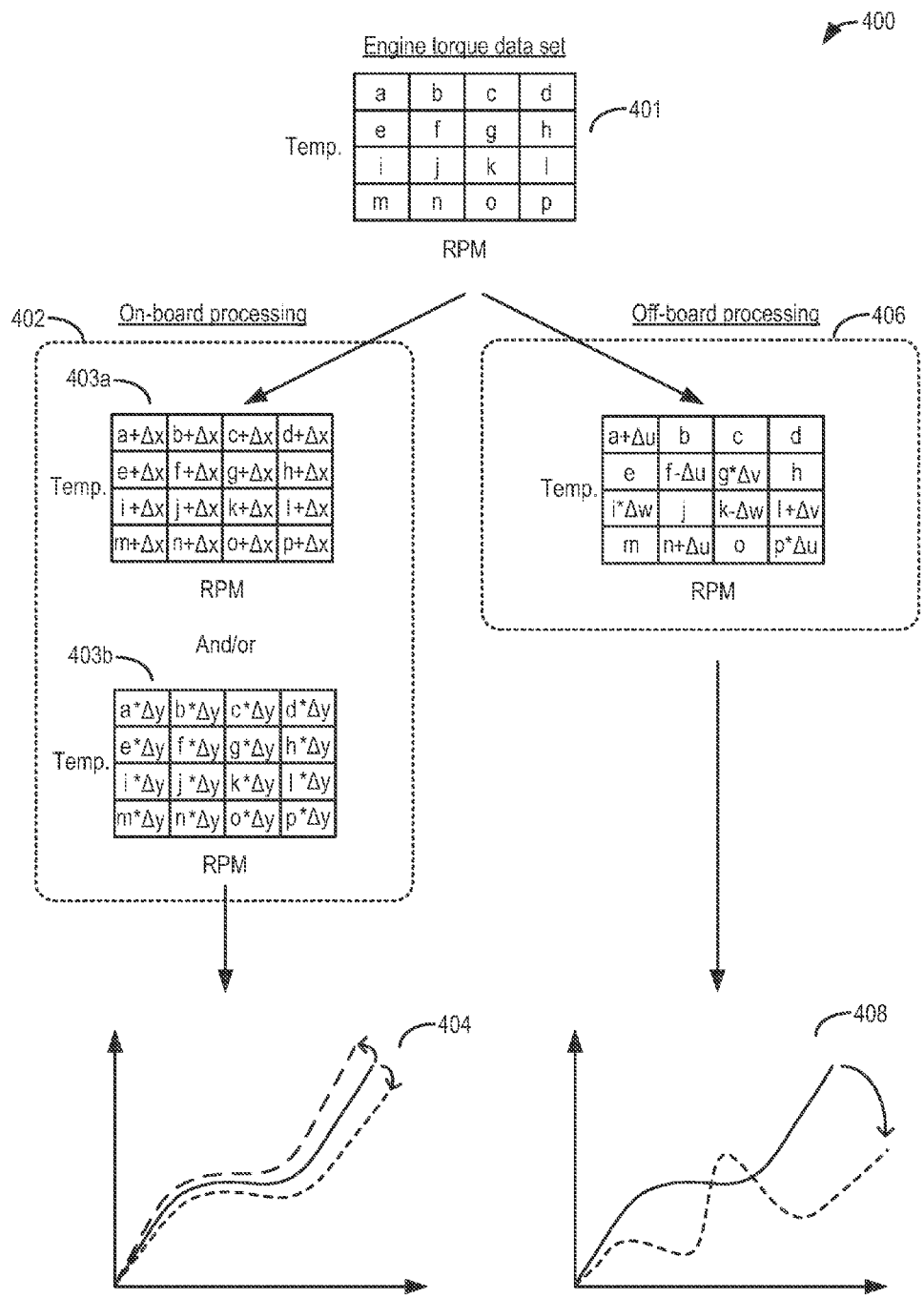
FIG. 4 shows example torque adjustments performed using the torque offsets generated on-board and off-board the vehicle.

In addition, the input from the various sensors and torque indicators may be used by control system 201 to compute an adaptive torque estimate 212. The adaptive torque estimate 212 may include various open and closed loop adjustments and may be used to perform an on-board adaptation 214. The on-board adaptation may include the determination of slope and offset modifiers with which engine torque data set 216 may be updated. The on-board vehicle control system 201 may then adjust each data point of the engine torque data set with a slope and offset modifier from engine torque data on-board the vehicle. Specifically, during the on-board adaptation, each data point is adjusted with the same slope and same offset modifier. As one example, the adjusting may include increasing each data point in the engine torque data set. As another example, the adjusting may include decreasing each data point in the engine torque data set. Example adjustments are depicted in FIG. 4.

In parallel, an off-board adaptation 220 of the engine torque data set may be performed by an off-board computing system, such as cloud computing system 202. Engine torque data set 216 as well as the on-board torque estimate 205 may be uploaded from the on-board vehicle control system to the cloud computing system for processing. In addition, raw data from the various on-board torque sensors may also be uploaded or relayed to the cloud computing system 202 for processing. The data from the various on-board sensors 210 and the engine torque data set may then be processed on the cloud computing system to determine an off-board torque estimate 218, which is compared to the on-board torque estimate 205. Based on the error between the two, an off-board adaptation 220 may be determined that includes the determination of distinct slopes and offset modifiers for selected data points of the engine torque data set. Specifically, the cloud computing system may adjust one or more data points of the engine torque data set, each of the one or more data points adjusted with different and independent adjustments. That is, each point may be adjusted differently and independent of other data points. As one example, the adjusting may include increasing a first data point in the engine torque data set by an amount while decreasing a second data point by a different amount, and while maintaining a third data point. Still other adjustments may be possible, as further elaborated by the example adjustments of FIG. 4.

As such, the off-board processing of the engine torque data set may be more computation intensive than the on-board processing of the data set. For example, the adjusting performed on-board the vehicle by the on-board vehicle control system 201 may include adjusting using a first computation model having a first, smaller number of parameters. In comparison, the adjusting performed off-board the vehicle by the cloud computing system 202 may include adjusting using a second computation model having a second, larger number of parameters. The first computation model may also use a first, narrower (that is, more restrictive) engine operating window while the second computation model may use a second, wider engine operating window. As an example, the first computation model may process and update the engine torque data set only when the engine speed is not changing, when the air temperature is between a predefined range, and/or when no malfunction indications are present. In comparison, the second computation model may process and update the data set during all engine speed and air temperature conditions, and even if a malfunction indication light is illuminated. As another example, the first computation model may process and update the engine torque data set during selected engine speed-load conditions only while the second computation model may process and update the data set during all engine speed-load conditions.

In some embodiments, in addition to using a computation model with more parameters, the off-board cloud computing system may also receive input from more sensors than the on-board computation system. As one example, in the depicted embodiment, on-board control system 201 may receive data input from a smaller subset (S1 and S2) of all the on-board sensors while off-board control system 202 may receive data input from a larger subset, or all (S1 through Sn) of the on-board sensors. Further, off-board control system 202 may receive data input from (on-board or off-board) sensors (Sz, Sy) that are not configured to feed data input to on-board control system 201.

Following the off-board processing, the processed data may be downloaded from the off-board cloud computing system to the on-board vehicle control system and used to update the engine torque data set. In this way, the engine torque data set may be periodically adjusted with updates generated on-board as well as off-board the vehicle. Engine operations may then be adjusted based on the updated torque data set by operating one or more torque actuators, as elaborated above.

Figure 3:
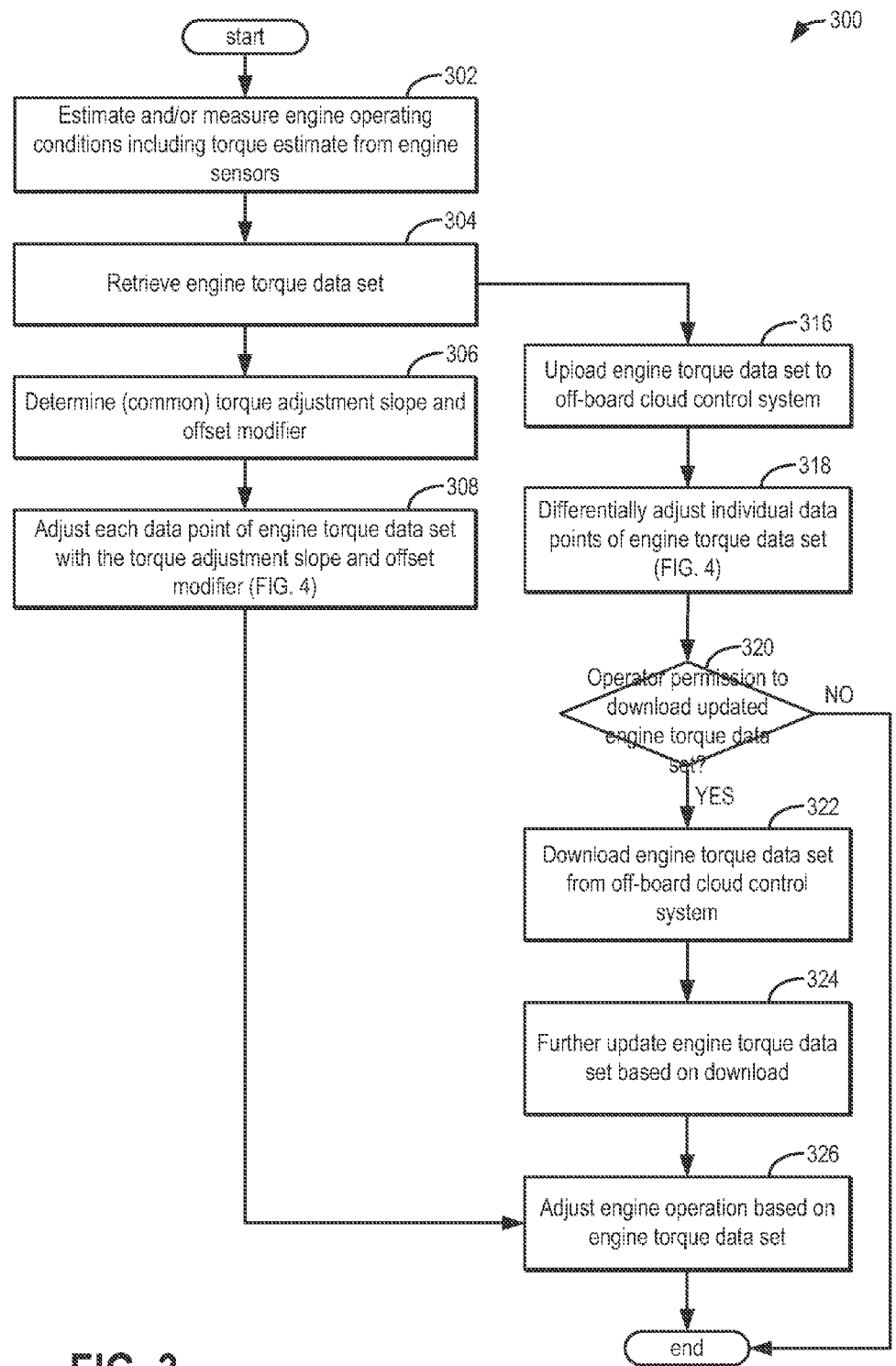
FIG. 3 shows an example flowchart for controlling a vehicle torque using torque offsets generated on-board and off-board the vehicle.

The processes depicted in map 200 are further clarified by the example routine 300 of FIG. 3 which illustrates a method for controlling a vehicle torque using torque offsets and adaptations generated both on-board and off-board the vehicle. In particular steps 302-308, and 326 of routine 300 may be performed on-board the vehicle by a vehicle control system while steps 316-324 may be performed off-board the vehicle by a cloud computing system communicatively coupled to the vehicle control system. The steps of FIG. 3 may be performed during vehicle operation, over a vehicle life. By adjusting the engine torque data using both sets of adaptations, higher torque accuracy can be achieved.

At 302, engine operating conditions may be estimated and/or inferred. These may include, for example, desired torque, engine speed, accelerator pedal position, barometric pressure, engine temperature, battery state of charge, etc. In addition, inputs may be received from one or more sensors (e.g., temperature sensors, pressure sensors, speed sensors, etc.) on-board the vehicle for estimating an engine torque. At 304, an engine torque data set may be retrieved. The engine torque data set may be stored in the memory of the vehicle's on-board control system. In one example, the engine torque data set may be stored as a 2D map plotted as a function of engine speed and engine component temperature.

At 306, the on-board control system may determine a common torque adjustment slope and modifier. As elaborated in FIG. 2, this may include determining an on-board torque estimate and using the on-board torque estimate to perform an on-board adaptation. As one example, the vehicle control system may determine a torque estimate using distinct approaches, and compare them to determine an on-board torque error. For example, the vehicle control system may compute a first torque estimate based on engine speed and exhaust temperature, while computing a second torque estimate based on torque converter input and output speeds. The control system may then compute a slope and/or offset modifier based on the torque error between the first and second torque estimates.

At 308, the on-board control system may adjust each data point of the engine torque data set with the determined torque adjustment slope and offset modifier. This includes scaling all data points of the engine torque data set on the on-board vehicle control system based on the on-board sensed and processed data. Scaling all the data points may include increasing or decreasing all the data points, en masse, with the common slope and modifier offset. As elaborated in FIG. 4, this causes a curve representing the torque function to be shifted along an axis (e.g., shifted up or down).

As such, the on-board adjusting may be a periodic adjusting wherein the control system may periodically adjust each data point on-board the vehicle at a first, shorter interval. As one example, the first interval may include a threshold number of combustion cycles. As another example, the first interval may include a predetermined sample rate or threshold duration (e.g., every second, every minute, etc.). In addition, the on-board adjusting and updating of the engine torque data set may be performed automatically and without receiving an input (e.g., without requiring a permission) from the vehicle operator. As such, steps 302-308 may be performed on-board the vehicle by an on-board vehicle control system.

In parallel, at 316, the engine torque data set may be uploaded to an off-board control system such as a cloud computing system that is communicatively coupled to the vehicle control system. At 318, the cloud computing system may process the data and determine an off-board torque estimate. The cloud computing system may then perform an off-board adaptation. This may include differentially adjusting individual data points of the engine torque data set. That is, a plurality of single data points of the engine torque set may be differentially adjusted on the vehicle control system based on the on-board sensed and processed data as well as data processed off-board the vehicle. The differential adjusting may include, for example, increasing a first data point (by a first amount) while decreasing a second data point (by a second amount) and while increasing a third data point (by a third amount). The first amount of increase in the first data point may be different from the second amount of decrease in the second data point and the third amount of increase in the third data point. As one example, the first data point may be increased more than the third data point while the decrease in the second point may be larger than the increase in the third data point. In still other examples, some data points may be increased, other data points may be decreased, while the remaining data points are maintained. As elaborated in FIG. 4, this can cause a change as well as a shift in a curve representing the torque function.

As such, the off-board adjusting may be a periodic adjusting wherein the control system may periodically adjust individual data points off-board the vehicle at a second, shorter interval. As one example, the second interval may include an engine-on/off cycle or a key-on/off cycle.

At 320, it may be determined if operator permission to download the updated engine torque data set has been received. As such, the off-board adjusting and updating of the engine torque data set may not be performed automatically and may be performed only upon receiving permission from the vehicle operator. In one example, at every engine-on/off cycle (or key-on/off cycle), a request to download updates from the cloud computing system may be displayed to the vehicle operator, such as, on a display screen on the vehicle dashboard.

If operator permission is received, then at 322, the routine includes downloading the processed and updates to the engine torque data set from the cloud computing system onto the vehicle control system. At 324, the engine torque data set may be further updated based on the downloaded updates.

At 326, engine operations may be adjusted based on the updated engine torque data set. Herein, the updated engine torque data set may include the on-board updates as well as the off-board updates if permission for downloading the off-board processed updates is received from the operator. Alternatively, the updated engine torque data set may include only the on-board updates if permission for downloading the off-board processed updates is not received from the operator. In this way, the method includes automatically, and without receiving an input from the operator, adjusting engine operation based the scaling of the engine torque data set, and adjusting engine operation based on the differential adjusting of the engine torque data set only upon receiving permission from an operator.

The steps of FIGS. 2-3 are further elaborated by the example adjustments of FIG. 4 at map 400. In particular, map 400 shows an (unadjusted) engine torque data set 401 that may be subjected to on-board processing 402 on-board a vehicle while also being subjected to off-board processing 406 away from the vehicle. The engine torque data set is represented herein as a 2D map plotted as a function of engine speed and temperature.

During on-board processing 402, each data point (a-m) of engine torque data set 401 may be adjusted with a slope and/or offset modifier. In particular, each data point may be adjusted with the same offset modifier (herein depicted as $\Delta x$ in updated engine torque data set 403$a$) and/or the same slope (herein depicted as $\Delta y$ in updated engine torque data set 403$b$). In the depicted example, each data point is increased by the same amount and/or multiplied by the same amount. However, in an alternate embodiment, each data point may be decreased by the same amount and/or divided by the same amount. Graph 404 shows how the on-board determined slopes and offset modifiers may change a curve (solid line) representing the torque function. As shown, the scaling of each data point may cause the resulting curve (dashed lines) to be shifted from the original curve along an axis (herein, the y-axis).

In comparison, during off-board processing 406, individual data points of engine torque data set 401 may be adjusted with different and independent slopes and/or offset modifiers. In particular, one or more data points (and not necessarily all data points) of the engine torque data set may be adjusted distinctly. In the depicted example, some data points (a, f, g, i, k, l, n and p) are adjusted while other data points (b-e, h, j, m, o) are maintained. However, in alternate embodiments, all the data points may be adjusted. The adjustments to the adjusted data points may be distinct. For example, a first data point may be increased while a second data point is decreased. Likewise, a third data point may be increased by an amount different from the increase in the first data point while a fourth data point is decreased by an amount different from the decrease in the second data point. In the depicted example, data point a is increased with an offset modifier $\Delta u$ while data point 1 is increased with a different offset modifier $\Delta v$. Likewise, data point f is decreased with an offset modifier $\Delta u$ while data point k is decreased with a different offset modifier $\Delta w$. As still another example, data point g is increased with slope $\Delta v$ while data points i and p are increased with different slopes $\Delta w$ and $\Delta u$, respectively. Graph 408 shows how the off-board adjustments may change a curve (solid line) representing the torque function. As shown, the increasing of some data points while decreasing of other data points may cause the resulting curve (dashed line) to be changed and shifted from the original curve.

In this way, by performing torque data processing on-board the vehicle using some parameters while performing more rigorous torque data processing off-board the vehicle using more parameters, a more reliable torque estimate may be achieved. By using both the on-board processed and off-board processed torque adjustments to update an engine torque data set, torque control accuracy can be improved without requiring extensive upgrades to the processing power and memory configuration of an on-board vehicle control system. Overall, by improving vehicle torque control, engine and vehicle performance may be improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling vehicle torque, comprising:
   adjusting each data point of an engine torque data set with a slope and offset modifier from engine torque data on-board the vehicle;
   adjusting individual data points of the engine torque data set from engine torque data off-board the vehicle; and
   adjusting an engine operation based on the engine torque data set.

2. The method of claim 1, wherein adjusting each data point with a slope and offset modifier from engine torque data on-board the vehicle includes adjusting each data point with the same slope and same offset modifier.

3. The method of claim 1, wherein adjusting individual data points from engine torque data off-board the vehicle includes adjusting one or more data points, each of the one or more data points adjusted with different, independent adjustments.

4. The method of claim 1, wherein adjusting on-board the vehicle includes adjusting using a first computation model having a first, smaller number of parameters, and wherein adjusting off-board the vehicle include adjusting using a second computation model having a second, larger number of parameters.

5. The method of claim 1, wherein adjusting on-board the vehicle includes adjusting via a vehicle control system on-board the vehicle, and wherein adjusting off-board the vehicle includes adjusting via a cloud computing system off-board the vehicle, the cloud computing system communicatively coupled to the vehicle control system.

6. The method of claim 1, wherein adjusting each data point on-board the vehicle includes increasing each data point or decreasing each data point.

7. The method of claim 1, wherein adjusting individual data points off-board the vehicle includes increasing a first data point, decreasing a second data point, and increasing a third data point, the first data point increased more than the third data point, the decrease in the second data point being larger than the increase in the third data point.

8. The method of claim 1, wherein the adjusting each data point includes periodically adjusting each data point on-board the vehicle at a first, shorter interval, and wherein the adjusting individual data points includes periodically adjusting individual data points off-board the vehicle at a second, longer interval.

9. The method of claim 8, wherein the first interval includes one of a threshold number of combustion cycles and a threshold duration, and wherein the second interval includes one of an engine-on/off cycle and a key-on/off cycle.

10. The method of claim 1, wherein the adjusting each data point on-board the vehicle is performed during a first engine operating window, and wherein the adjusting individual data points off-board the vehicle is performed during a second engine operating window, the first operating window more restrictive than the second operating window.

11. A method, comprising:
during vehicle operation over a vehicle life:
scaling all data points of an engine torque data set on an on-board vehicle control system based on on-board sensed and processed data; and
differentially adjusting a plurality of single data points of the engine torque data set on the vehicle control system based on on-board sensed and processed data and off-board processed data; and
adjusting engine operation based on the data set.

12. The method of claim 11, wherein the scaling all data point includes increasing or decreasing all data points with a common slope and offset modifier, and wherein differentially adjusting a plurality of single data points includes increasing a first data point by a first amount while decreasing a second data point by a second, different amount.

13. The method of claim 11, wherein off-board processed data includes data processed on a cloud computing system.

14. The method of claim 13, further comprising, uploading the engine torque data set from the vehicle control system to the cloud computing system for processing, and downloading the processed data set from the cloud computation system onto the vehicle control system.

15. The method of claim 11, wherein the on-board processed data is processed using a first computation model having a first, smaller number of parameters and a first, narrower engine operating window, and wherein the off-board processed data is processed using a second computation model having a second, larger number of parameters and a second, wider engine operating window.

16. The method of claim 11, wherein the scaling all data points is performed once every threshold duration, and wherein the differentially adjusting is performed once every key-on/off event.

17. A vehicle system, comprising:
an engine;
one or more engine torque indicators;
and an on-board control system communicatively coupled to an off-board control system, the on-board control system including computer readable instructions for:
processing raw data received from the one or more engine torque indicators;
scaling every data point of an engine torque data set stored on the on-board control system based on the processing;
uploading the raw data to the off-board control system for processing;
downloading processed data from the off-board control system;
differentially adjusting single data points of the engine torque data set based on downloaded data; and
adjusting engine operation based on the engine torque data set.

18. The vehicle system of claim 17, wherein the off-board control system is a cloud computing system in wireless communication with the on-board control system.

19. The vehicle system of claim 17, wherein the scaling every data point includes increasing or decreasing each data point by a common slope and offset modifier, and wherein differentially adjusting single data points includes increasing a first data point by an amount, decreasing a second data point by a different amount, and maintaining a third data point.

20. The vehicle system of claim 17, wherein adjusting engine operation includes,
automatically, and without receiving an input from the operator, adjusting engine operation based on the scaling of the engine torque data set; and
adjusting engine operation only upon receiving permission from an operator to adjust engine operation based on the differential adjusting of the engine torque data set.

21. The vehicle system of claim 17, wherein the engine torque indicators include one or more of crankshaft torque sensors, a zero torque measurement in a transmission based on an open clutch state; cylinder pressure sensors; a pumping torque estimate; transmission input or output shaft torque sensors; a transmission gear ratio estimate; torque multiplication and/or losses to translate measured torque into engine crankshaft torque; an engine torque estimate based on torque balance with torque measured or inferred from an electric motor; an engine torque estimate based on torque converter turbine torque calculated from measured turbine and impeller speeds, a characterization of the torque converter, and other torque sources or losses between the impeller and engine output; an engine torque estimate based on estimated transmission clutch torque; and an engine torque estimate based on vehicle acceleration.

* * * * *